US 8,274,668 B2

(12) United States Patent
Nakayama et al.

(10) Patent No.: US 8,274,668 B2
(45) Date of Patent: Sep. 25, 2012

(54) IMAGE PROCESSING APPARATUS, COPIER, AND IMAGE PROCESSING METHOD AND PROGRAM

(75) Inventors: Masaki Nakayama, Shiojiri (JP); Yoichiro Maki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 1267 days.

(21) Appl. No.: 12/069,140

(22) Filed: Feb. 7, 2008

(65) Prior Publication Data

US 2009/0128842 A1   May 21, 2009

(30) Foreign Application Priority Data

Feb. 7, 2007 (JP) ................................. 2007-028063

(51) Int. Cl.
*G06F 3/12* (2006.01)

(52) U.S. Cl. ..................... 358/1.13; 358/1.16; 358/1.15; 358/1.1

(58) Field of Classification Search .................. 358/1.16, 358/1.15, 1.1
See application file for complete search history.

(56) References Cited

U.S. PATENT DOCUMENTS

| 6,318,915 | B1 * | 11/2001 | Matsuoka ..................... 400/279 |
| 2003/0095300 | A1 * | 5/2003 | Nakatani et al. .............. 358/523 |
| 2005/0168770 | A1 * | 8/2005 | Kurose et al. ................. 358/1.15 |
| 2005/0213150 | A1 * | 9/2005 | Kobayashi .................... 358/1.15 |
| 2009/0128842 | A1 | 5/2009 | Nakayama et al. |

FOREIGN PATENT DOCUMENTS

| EP | 1619605 | 1/2006 |
| JP | 05-040848 A | 2/1993 |
| JP | 05-040848 A | 2/1993 |
| JP | 09-006917 | 1/1997 |
| JP | 09-252386 | 9/1997 |
| JP | 2000-001015 A | 1/2000 |
| JP | 2002-103720 | 4/2002 |
| JP | 2004-326568 A | 11/2004 |
| JP | 2005-225171 | 8/2005 |
| JP | 2008-188936 A | 8/2008 |

OTHER PUBLICATIONS

Matsudaira et al., Serial Printer and Recording Medium Having Recorded Program, Jul. 28, 2005, (JP 2005199727 A).*

* cited by examiner

*Primary Examiner* — Benny Q Tieu
*Assistant Examiner* — Martin Mushambo
(74) *Attorney, Agent, or Firm* — Nutter McClennen & Fish LLP; John J. Penny, Jr.; Christina M. Sperry

(57) ABSTRACT

An image processing apparatus that generates printing data comprising a scanner mechanism that reads an image of a document to set the read image as image data; a printing-pixel number distribution grasping member that sets a band as one unit, and grasps distribution of the number of printing pixels in a main scanning direction of the serial printer in every band; a processing-band setting member that sequentially sets each band as a processing band; a reference position setting member that sets an analyzing band, obtains a cumulative value and sets a start reference position when the cumulative value exceeds a predetermined range, and obtains a cumulative value and sets a end reference position when the cumulative value exceeds the predetermine range; and a printing-data generating member that generates printing data by setting a printing area based on the start reference position and the end reference position.

11 Claims, 11 Drawing Sheets

IMAGE PROCESSING APPARATUS, COPIER, AND IMAGE PROCESSING METHOD AND PROGRAM

BACKGROUND

1. Technical Field

The present invention relates to an image processing apparatus, a copier, and image processing method and program.

2. Related Art

Figure 11:
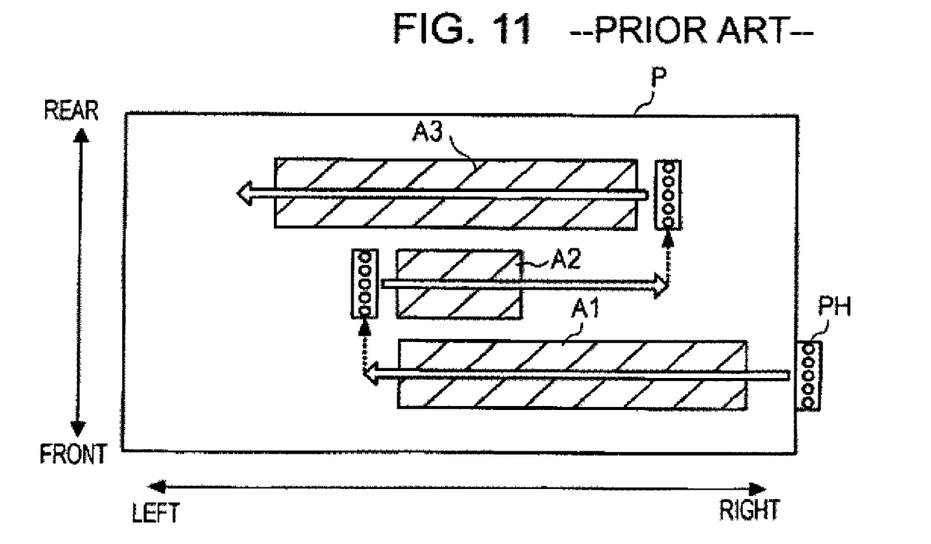
FIG. 11 is a diagram for explaining a general logical seek printing operation.

In the past, a serial printer such as an ink jet printer, a dot impact printer, and a thermal printer was known. Such a type of serial printer performs a printing operation on a paper sheet by a series of operations in which ink is ejected on the paper sheet while a printing head is moved in a main scanning direction (for example, right and left directions), and then the paper sheet is transported in a sub-scanning direction (for example, front and rear directions) by a transport roller. Moreover, as a method of moving the printing head, such a type of serial printer uses a method called a logical seek. The logical seek refers to a method of minimizing movement of the printing head before the next time movement of the printing head. For example, when first to third character string existence areas A1 to A3 extended in right and left directions of a paper sheet P are arranged sequentially from the front of the paper sheet P, as shown in FIG. 11, the logical seek will be described. In FIG. 11, white arrows represent a movement direction of a printing head PH and black arrows represent a relative movement direction of the printing head PH for the paper sheet P (practically, the printing head PH is not moved in the front and rear directions, but the paper sheet P is transported in the front and rear directions). First, the printing head PH ejects ink on the first character string existence area A1 while moving in the left direction from the right end which is a home position, and then moves to the left end of the second character string existence area A2 without ejecting ink. Afterward, the paper sheet P is transported in the front direction. Subsequently, the printing head PH ejects ink on the second character string existence area A2 while moving the right direction from that position, and then moves to the right end of the third character string existence area A3. Afterward, the paper sheet P is transported in the front direction. Subsequently, the printing head PH ejects ink on the third character string existence area A3 while moving the left direction from that position. By using such a logical seek, it is possible to shorten movement period of time of the printing head, and furthermore shorten printing period of time. This type of logical seek is disclosed in JP-A-9-252386.

Figure 12:
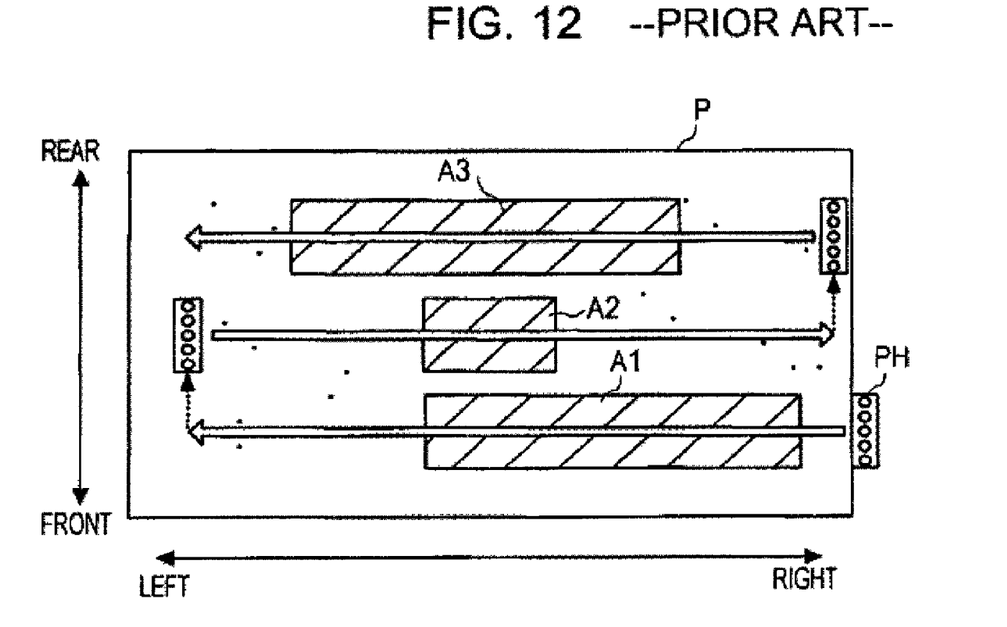
FIG. 12 is a diagram for explaining the logical seek printing operation when isolated points are present.
Figure 13:
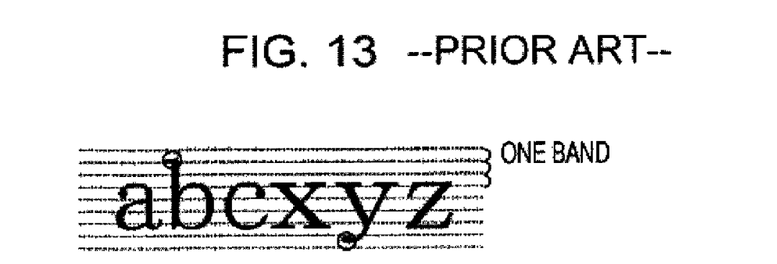
FIG. 13 is a diagram for explaining that characters are not appropriately printed when the isolated points are removed.

However, the printing period of time may not be shortened in a case where image data obtained by scanning an image by a scanner is printed by the serial printer using this logical seek. That is, in a case where the obtained image data have isolated points caused by dust and the like in areas other than the first to third character string existence areas A1 to A3 which are originally printed areas, an advantage of the logical seek may not be obtained. That is because the movement period of time of the printing head PH becomes longer, as shown in FIG. 12. In order to solve this problem, removing the isolated points can be taken into consideration. However, for example, as shown in FIG. 13, the upper portion (within a circle in FIG. 13) of a character b in a character string "abcxyz" protrudes more upward than the upper portions of the other characters, and the lower portion (within a circle in FIG. 13) of a character y thereof protrudes more downward than the lower portions of the other characters. Consequently, when the isolated points are removed in every band (each of which are constituted by several lines), the upper portion of the character b or the lower portion of the character y is determined as the isolated point. Therefore, a problem arises in that the upper portion or the lower portion thereof may not be printed.

SUMMARY

An advantage of some aspects of the invention is that it provides an image processing apparatus, a copier, image processing method and program designed to shorten a printing period of time in a case where a serial printer uses a logical seek function even though an isolated point is included in read image data. Moreover, another advantage of some aspects of the invention is that it provides the image processing apparatus, the copier, the image processing method and program designed not to process the upper portion or the lower portion of a character to be printed as the isolated point.

The invention uses the following aspects in order to achieve at least one of the mentioned advantages.

According to an aspect of the invention, there is provided an image processing apparatus which generates printing data used in a serial printer having a logical seek function including: a scanner mechanism that reads an image of a document to set the read image as image data; a printing-pixel number distribution grasping member that sets a band constituted by a predetermined number of sequentially accumulated lines in the image data as one unit, and grasps distribution of the number of printing pixels in a main scanning direction of the serial printer in every band; a processing-band setting member that sequentially sets each band as a processing band; a reference position setting member that sets an analyzing band including the set processing band, that obtains a cumulative value by cumulating the number of printing pixels of the analyzing band sequentially from one end to the other end of the analyzing band, and sets a position in the main scanning direction at the time when the cumulative value exceeds a predetermined range as a print start reference position, and that obtains a cumulative value by cumulating the number of printing pixels of the analyzing band sequentially from the other end to the one end of the processing band and sets a position in the main scanning direction at the time when the cumulative value exceeds the predetermined range as a print end reference position; and a printing-data generating member that generates printing data by setting a printing area on the basis of the print start reference position and the print end reference position.

In the image processing apparatus, the analyzing band including the set processing band is set, the cumulative value is obtained by cumulating the number of printing pixels of the analyzing band sequentially from the one end to the other end. In addition, the position in the main scanning direction at the time when the cumulative value exceeds a predetermined range is set as a print start reference position. The cumulative value is obtained by cumulating the number of printing pixels of the analyzing band sequentially from the other end to the one end of the processing band and a position in the main scanning direction at the time when the cumulative value exceeds the predetermined range is set as a print end reference position. In addition, the printing data is generated on the basis of the print start reference position and the print end reference position. In a case where the printing area is present in a certain band, the cumulative value obtained by cumulating the number of printing pixels generated due to the isolated points does not exceed the normal predetermined range even though the isolated points are present between the one end of the band to the printing area or between the other end and the printing area. On the other hand, after reaching the printing area, the number of printing pixels is abruptly increased, and thus the cumulative value exceeds the predetermined range. Consequently, a position in the main scanning direction at the time when the cumulative value obtained by cumulating the number of printing pixels from the one end of the band to the other end thereof exceeds the predetermined range is set as the print start reference position and a position in the main scanning direction at the time when the cumulative value obtained by cumulating the number of printing pixels from the other end of the band to the one end thereof exceeds the predetermined range is set as the print end reference position. In addition, the printing data is generated by setting the printing area on the basis of the print start reference position and the print end reference position. In this way, it is possible to grasp the isolated points present between the one end of the band to the printing area or between the other end thereof to the printing area. Consequently, a serial printer can remove such isolated points and can use the logical seek function to perform printing. In this way, even when the isolated points are included in the read image data, it is possible to provide the printing data designed to sufficiently shorten the printing period of time when the serial printer uses the logical seek function.

In this case, the "predetermined range" is experientially set as a range which is not exceeded even when the number of printing pixels of the isolated points is cumulated and can be exceeded when the number of printing pixels of characters or the like is cumulated. That is, it is known from experience that the cumulative value of the number of printing pixels is abruptly increased in a position in which characters, figures, signs, or the like are present, comparing with a position in which the isolated points are present. It is desirable that an upper limit value of the predetermined range is set so as to be increased as a resolution of the scanner mechanism is larger.

In the image processing apparatus having the above-described configuration, the reference position setting member may set the processing band and one or more bands each present above and below the processing band as the analyzing band in setting the analyzing band. In this way, the processing band at the time when the cumulative value of the number of printing pixels is obtained and one or more bands each present above and below the processing band are set as the analyzing band. Consequently, it is unlikely that the upper portions or the lower portions of characters or the like (character, figures, signs, etc.) to be printed are processed as the isolated points, comparing with a case where only the processing band is set as the analyzing band.

In the image processing apparatus having the above-described configuration, in setting the analyzing band, the reference position setting member may set the total three bands of the processing band and two bands each present above and below the processing band, the reference position setting member may prepare a virtual band of which all pixels are white above the uppermost band and prepares the virtual band below the lowermost band, and when the uppermost band or the lowermost band may be set as the processing band, the reference position setting member adds the virtual band as one of the three bands. In this way, a processing period of time of the reference position setting member can be shortened, comparing with a case where four or more bands are set as the analyzing band. Moreover, even when the processing band is the uppermost band or the lowermost band, the three bands can be processed as the analyzing band. Such a virtual band may not be prepared. As for the uppermost band, the total two bands of the uppermost band and the band below the uppermost band may be set as the analyzing band. In addition, as for the lowermost band, the total two bands of the lowermost band and the band above the lowermost band may be set as the analyzing band.

In the image processing apparatus having the above-described configuration, in setting the printing area, the printing-data generating member may set a position returned from the print start reference position to the one end by a predetermined margin as the print start position of the printing area, and also may set a position advanced from the print end reference position to the other end by the predetermined margin as the print end position. Consequently, the print start position or the print end position may not be set in the inside of the area in which characters or the like extended in the main scanning direction. For example, even when one isolated point is not present, the print start position or the print end position may intrude into the area in which the characters or the like are present. However, since the print start position and the print end position are set so as to contain the area from the print start reference position to the print end reference position, the print start position or the print end position may not be set in the inside of the area in which characters or the like extended in the main scanning direction.

The image processing apparatus having the above-described configuration may further include a printing-area setting member that sets the pixel number of an upper limit value of the predetermined range as the margin value. For example, suppose that a rule line having one pixel length extended in the main scanning direction is present in the processing band of the analyzing band, but the printing pixels are not present except for the rule line. At this time, the cumulated pixels are all pixels to be printed. Consequently, when the cumulative value exceeds the predetermined range, the cumulative pixels can be treated as the pixels to be printed by setting the pixel number of the upper limit value of the predetermined range as a martin value and restoring the pixel number by the margin value. The number exceeding the pixel number of the upper limit value of the predetermined range may be set as the margin value. However, since the isolated points which are not required to be printed may be printed in an original printing operation in this case, it is desirable that the pixel number of the upper limit value is set as the margin value.

In the image processing apparatus having the above-described configuration, the printing-data generating member may generate printing data by changing pixels present in an area other than the printing area into a white color in the image data. In this way, the serial printer which has acquired the printing data can perform a printing operation by using the normal logical seek in order to sufficiently shorten the printing period of time.

In the image processing apparatus having the above-described configuration, the printing-data generating member may generate printing data by adding information about the printing area to the image data. In this way, the serial printer which has acquired the printing data can perform a printing operation only on the printing area by grasping the printing area through the information about the printing area. Consequently, in the image processing apparatus, it is not necessary to change the pixels present in an area other than the printing area into the white color. As a result, a period of time necessary to generate the printing data can be shortened.

In the image processing apparatus having the above-described configuration, in cumulating the number of printing pixels of the analyzing band, the printing-pixel number distribution grasping member may divide a width direction of the analyzing band into a block unit containing a predetermined plurality of pixels and cumulates the number of printing pixels of every block. For this reason, a capacity of a storage area for storing the cumulative value can be small, comparing with a case where the number of printing pixels is cumulated in every pixel.

In the image processing apparatus having the above-described configuration, the reference position setting member may obtain a cumulative value by cumulating the number of printing pixels of the analyzing band sequentially from the one end to the other end, and when the cumulative value does not exceed a predetermined range at the other end, the reference position setting member may not cumulate the number of printing pixels of the analyzing band sequentially from the other end to the one end, and it is considered that the printing area of the processing band is not present. In this way, the cumulative value is obtained by cumulating the number of printing pixels of the analyzing band sequentially from the one end to the other end, and when the cumulative value does not exceed the predetermined range at the other end, it is obvious that no pixel to be printed is present in the processing band included in the analyzing band. Consequently, cumulating the number of printing pixels in a reverse direction, that is, a direction directed from the other end to the one end can be omitted. As a result, it is possible to shorten a processing period of time of the reference position setting member.

According to another aspect of the invention, there is provided a copier including the image processing apparatus according to the above-described configuration and a serial printer that receives printing data from the image processing apparatus and performs a printing operation using a logical seek function on the basis of the printing data.

The copier is mounted with the image processing apparatus having one of the above-described configurations. Consequently, it is possible to obtain one of the above-described advantages, for example, the advantage that shortening the printing period of time sufficiently at the time when the serial printer uses the logical seek function can be possible or the advantage that the upper portion or the lower portion of a character or the like is not treated as the isolated point.

According to still another aspect of the invention, there is provided an image processing method which generates printing data used in a serial printer having a logical seek function and is executed by computer software, the method including: (a) reading an image of a document to set the read image as image data; (b) setting a band constituted by a predetermined number of sequentially accumulated lines in the image data as one unit, and grasps distribution of the number of printing pixels in a main scanning direction of the serial printer in every band; (c) sequentially setting each band as a processing band; (d) setting an analyzing band including the set processing band, obtaining a cumulative value by cumulating the number of printing pixels of the analyzing band sequentially from one end to the other end of the processing band to set a position in the main scanning direction at the time when the cumulative value exceeds a predetermined range as a print start reference position, and obtaining a cumulative value by cumulating the number of printing pixels of the analyzing band sequentially from the other end to the one end to set a position in the main scanning direction at the time when the cumulative value exceeds the predetermined range as a print end reference position; and (e) generating printing data by setting a printing area on the basis of the print start reference position and the print end reference position.

In the image processing method, the cumulative value obtained by cumulating the number of printing pixels generated due to the isolated points does not exceed the normal predetermined range even though the isolated points are present between the one end of the band and the printing area or between the other end and the printing area in a case where the printing area is present in a band. Meanwhile, in the printing area, the number of printing pixel is abruptly increased, and thus the cumulative value exceeds the predetermined range. Consequently, the position in the main scanning direction at the time when the cumulative value obtained by cumulating the number of printing pixels from the one end to the other end of the band exceeds the predetermined range is set as the print start reference position; the position in the main scanning direction at the time when the cumulative value obtained by cumulating the number of printing pixels from the other end to the one end of the band is set as the print end reference position; the printing area is set on the basis of the print start reference position and the print end reference position to generate the printing data. In this way, it is possible to grasp the isolated points present between the one end of the band to the printing area or between the other end of the band to the printing area. Consequently, the serial printer can remove such isolated points and perform a printing operation using the logical seek function. Even when the isolated points are included in the read image data, it is possible to provide the printing data which makes it possible to sufficiently shorten the printing period of time when the serial printer uses the logical seek function. In the image processing method according to the invention, a step of realizing one of the functions of the image processing apparatus which have been described above may be added.

According to still another aspect of the invention, there is provided a program to be executed by one or plural computers for carrying out the image processing method according to the above-described configuration. The program may be stored in a storing medium (for example, a hard disc, ROM, FD, CD, DVD, etc.) which a computer can read, may be delivered from one computer to another computer through a transport medium (communication network such as Internet or LAN), and may be received or transported in any form. When the program is executed by one computer or each of the steps are shared with a plurality of computer, it is possible to obtain the same advantages as those of the image processing method according to the invention.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
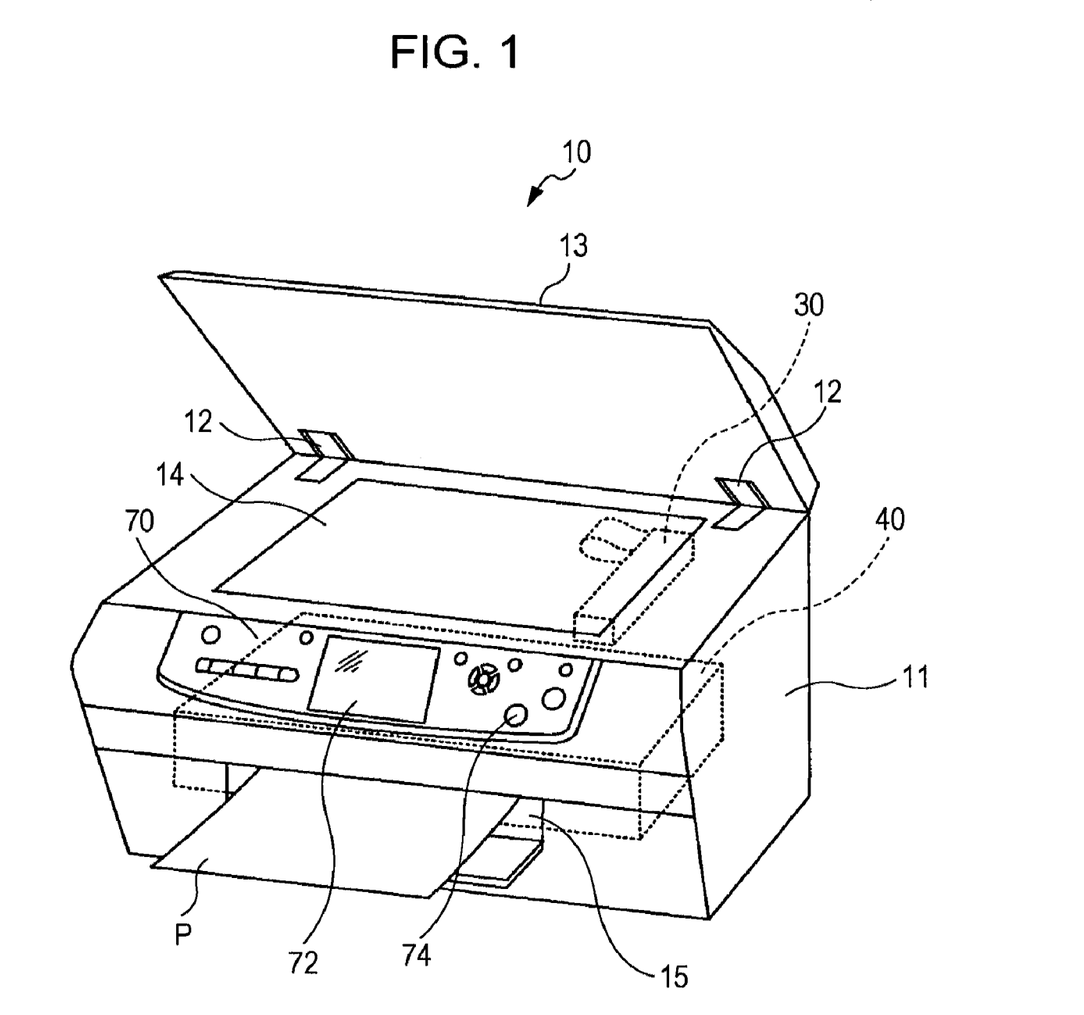
FIG. 1 is a perspective view illustrating a multi-function printer.
Figure 2:
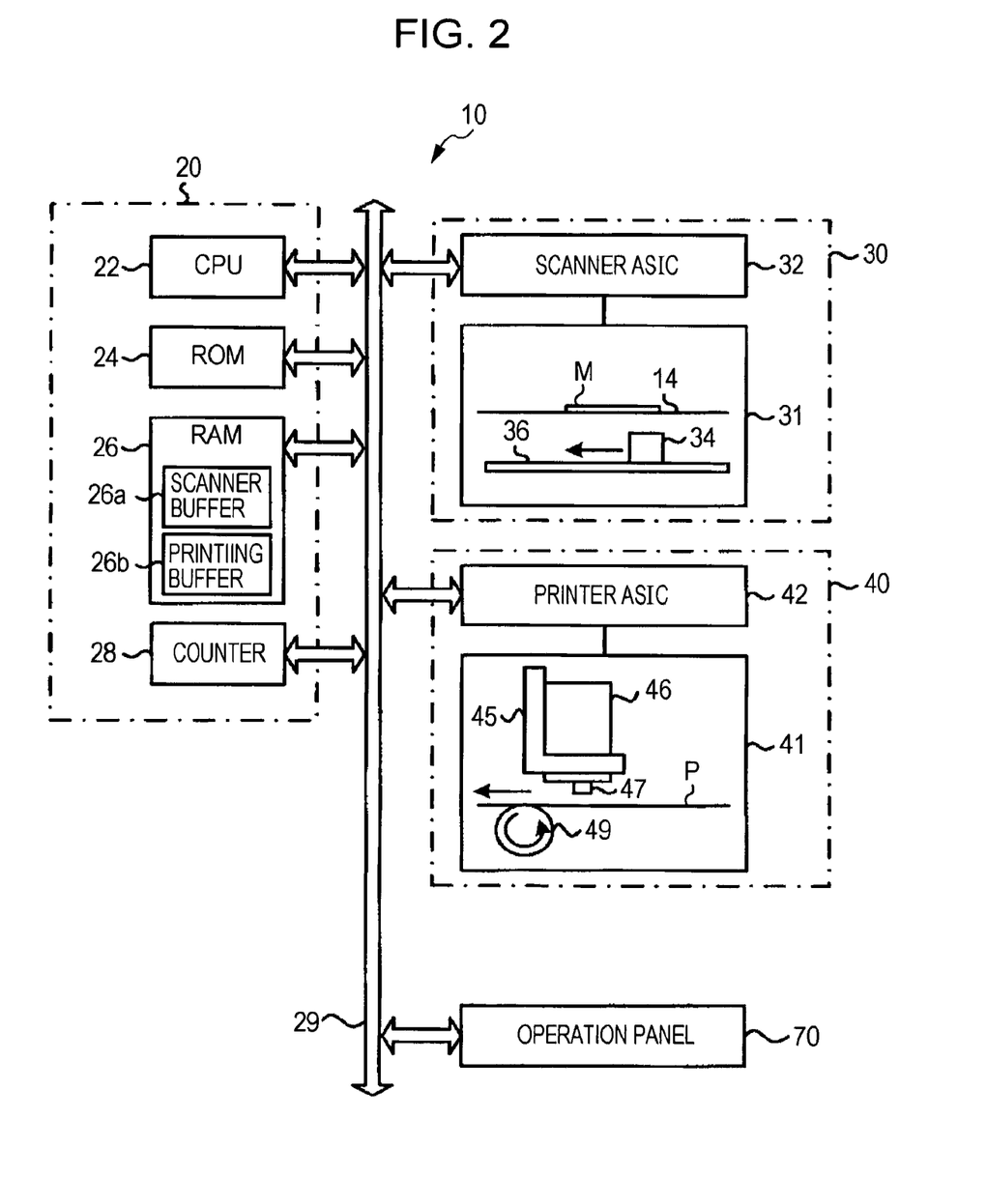
FIG. 2 is a block diagram illustrating electrical connection of the multi-function printer.
Figure 3:
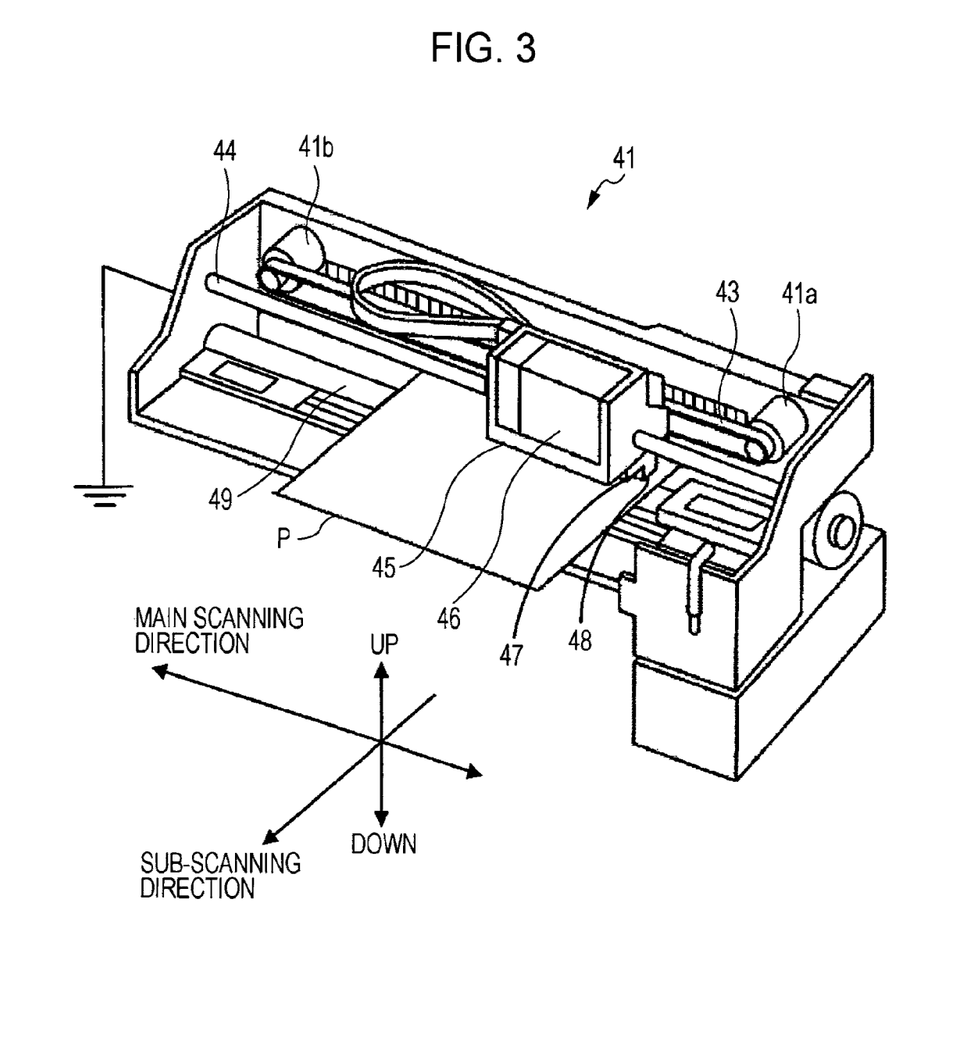
FIG. 3 is a perspective view illustrating a printer mechanism.

An embodiment of the invention will be described with reference to the drawings. FIG. 1 is a perspective view illustrating a multi-function printer 10 according to an embodiment of the invention. FIG. 2 is a block diagram illustrating electrical connection of the multi-function printer 10. FIG. 3 is a perspective view illustrating a printer mechanism 41.

As shown in FIG. 1, the multi-function printer 10 according to the embodiment includes a cover 13 which is attached to one side of the top surface of a case 11 so as to be opened and closed through hinges 12; a scanner unit 30 which scans a target placed on the upper surface of a glass plate 14 through the glass plate 14 inserted on the top surface of the case 11; an ink jet printer unit 40 which is disposed below the scanner unit 30, performs a printing operation of an ink jet type on a paper sheet P fed from the rear surface of the case 11, and discharges the printed paper sheet P through a discharging port 15 disposed the front surface of the case 11; and an operation panel 70 which is provided with buttons 74 such as a power switch, a copy button, a scan button, and a print button in addition to a display 72 for displaying various types of information.

As shown in FIG. 2, the scanner unit 30 includes a scanner mechanism 31 for performing a scanner function and a scanner ASIC 32 for controlling the scanner mechanism 31. An application specific integrated circuit is abbreviated to "ASIC". The scanner mechanism 31, which is a so-called flatbed type, includes a line image sensor 34 for optically reading a target M placed on the glass plate 14 through the glass plate 14, and a moving portion 36 for scanning the line image sensor 34 in order to read the target M. The scanner ASIC 32 is an IC chip which has a function of controlling the scanner mechanism 31 and stores data read by the line image sensor 34 of the scanner mechanism 31 in a scanner buffer 26a provided with an RAM 26 of a controller 20. The line image sensor 34 is a known color image sensor which decomposes light emitted toward and reflected from the target M into colors of red (R), green (G), and blue (B) to set them as scan data.

As shown in FIG. 2, the ink jet printer unit 40 includes a printer mechanism 41 and a printer ASIC 42. The printer mechanism 41 is configured as a full-color ink jet printer. As shown in FIG. 3, the printer mechanism 41 includes a carriage 45 which reciprocates in right and left directions along a guide 44 by a timing belt 43 suspended between a driving wheel 41a and a driven wheel 41b; ink cartridges 46 which are mounted on the carriage 45 and each contain cyan ink, magenta ink, yellow ink, light cyan ink, light magenta ink, and black ink; a printing head 47 which applies a pressure to each ink supplied from each of the ink cartridges 46, a nozzle 48 which ejects ink droplets to which the printing head 47 has applied the pressure on the paper sheet P which is a printing medium; and a transport roller 49 which transports the paper sheet P. In this embodiment, the printing head 47 uses a method of deforming a piezoelectric element to apply a pressure to ink by applying a voltage to the piezoelectric element. However, a method of applying a pressure to ink by bubbles generated by applying a voltage to a heating resistance member (for example, heater, etc.) and heating the ink may be used. The printer ASIC 42 is an IC chip which has a function of controlling the printer mechanism 41, develops printing data in the printing buffer 26b disposed in the RAM 26 into a bitmap image on every page, and controls the printer mechanism 41 so as to print the developed data on the paper sheet P. A movement direction of the carriage 45 refers to a main scanning direction and a transport direction of the paper sheet P refers to a sub-scanning direction.

AS shown in FIG. 2, the controller 20 is constituted by a microprocessor in which a CPU 22 serves as a main component, an ROM 24 for storing various processing programs, the RAM 26 for temporarily memorizing data or storing data, and a counter 28 for being used when the number of times are counted. The controller 20 is connected to the scanner ASIC 32, the printer ASIC 42, and the operation panel 70 through a bus 29. The RAM 26 includes a plurality of areas. A scanner buffer 26a for temporarily memorizing image data read by the scanner unit 30 and the printer buffer 26b for temporarily memorizing printing data to be printed by the ink jet printer unit 40 are included in the areas. Various instruction signals from the operation panel 70, signals (including the image data) about various images read from the scanner ASIC 32, signals about various types of printing operations from the printer ASIC 42, and the like are input to the controller 20. Output signals from the display 72 of the operation panel 70, controlling signals from the scanner ASIC 32, controlling signals from the printer ASIC 42, and the like are output from the controller 20.

Figure 4:
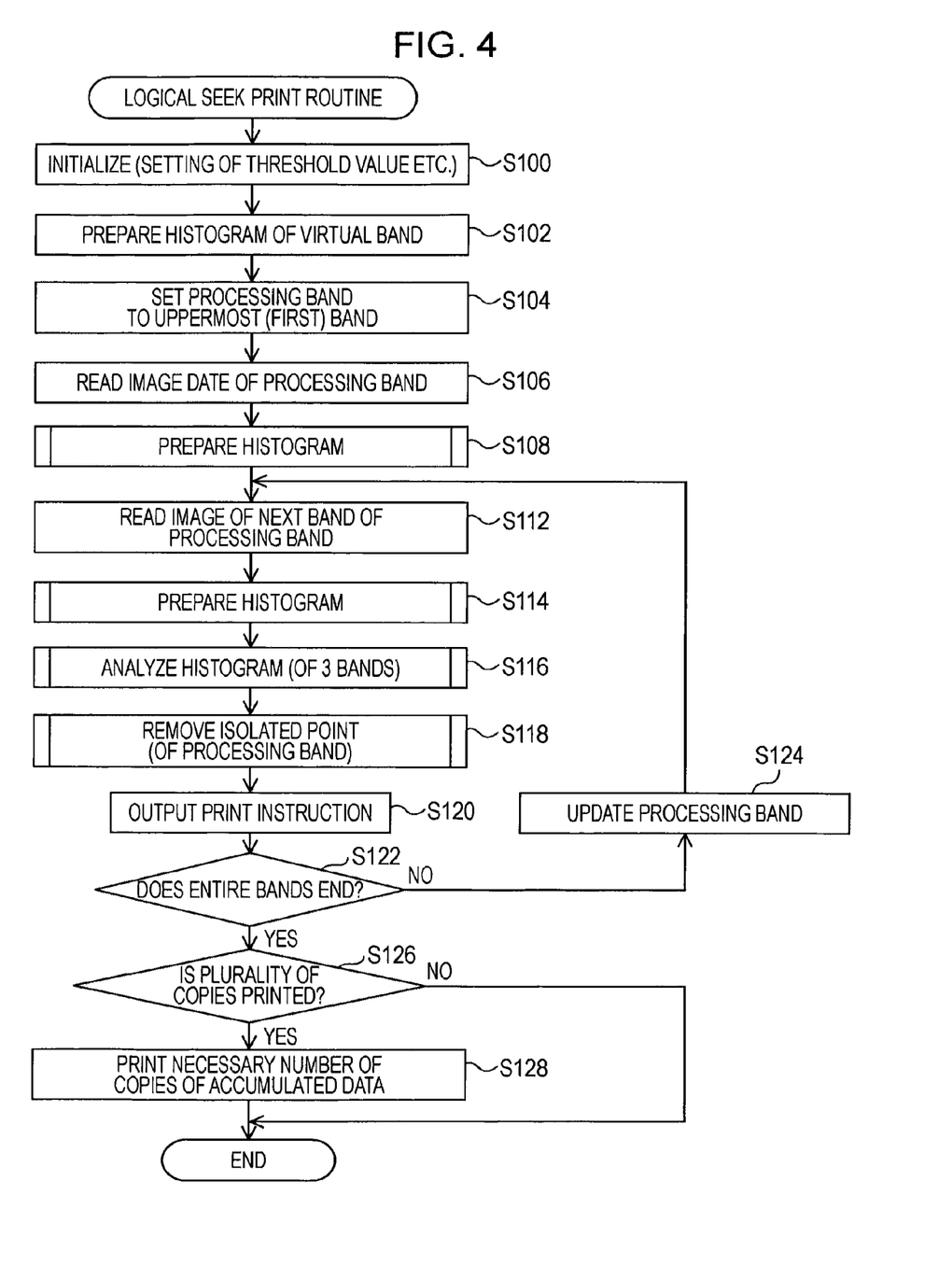
FIG. 4 is a diagram illustrating a flowchart of a logical seek print routine.

Next, an operation of the multi-function printer 10 according to the embodiment, particularly, a logical seek print routine in which the printing data for logical seek is generated and the logical seek is performed on the basis of the printing data to perform printing will be described. The logical seek refers to a method of minimizing movement of the printing head 47 before the next movement of the printing head 47 when the printer ASIC 42 controls the printer mechanism 41 on the basis of the printing data. The detailed description has been made in Related Art, and thus the description is omitted in the embodiment. FIG. 4 is a diagram illustrating a flowchart of the logical seek print routine.

When a user presses the copy button (not shown) of the operation panel 70, the scanner ASIC 32 scans the line image sensor 34 to read an image of the target M placed on the glass plate 14, and stores the read image as scan data in the scanner buffer 26a. The logical seek print routine is a routine which is performed by the CPU 22 of the controller 20 after the scan data is stored in the scanner buffer 26a in this way. In addition, a logical seek print program is memorized in the ROM 24. When the logical seek print routine is performed, it is supposed that the user selects not a photograph but a document (which includes characters, figures, signs, etc.) as a type of the target M to be copied before pressing the copy button.

Figure 8:
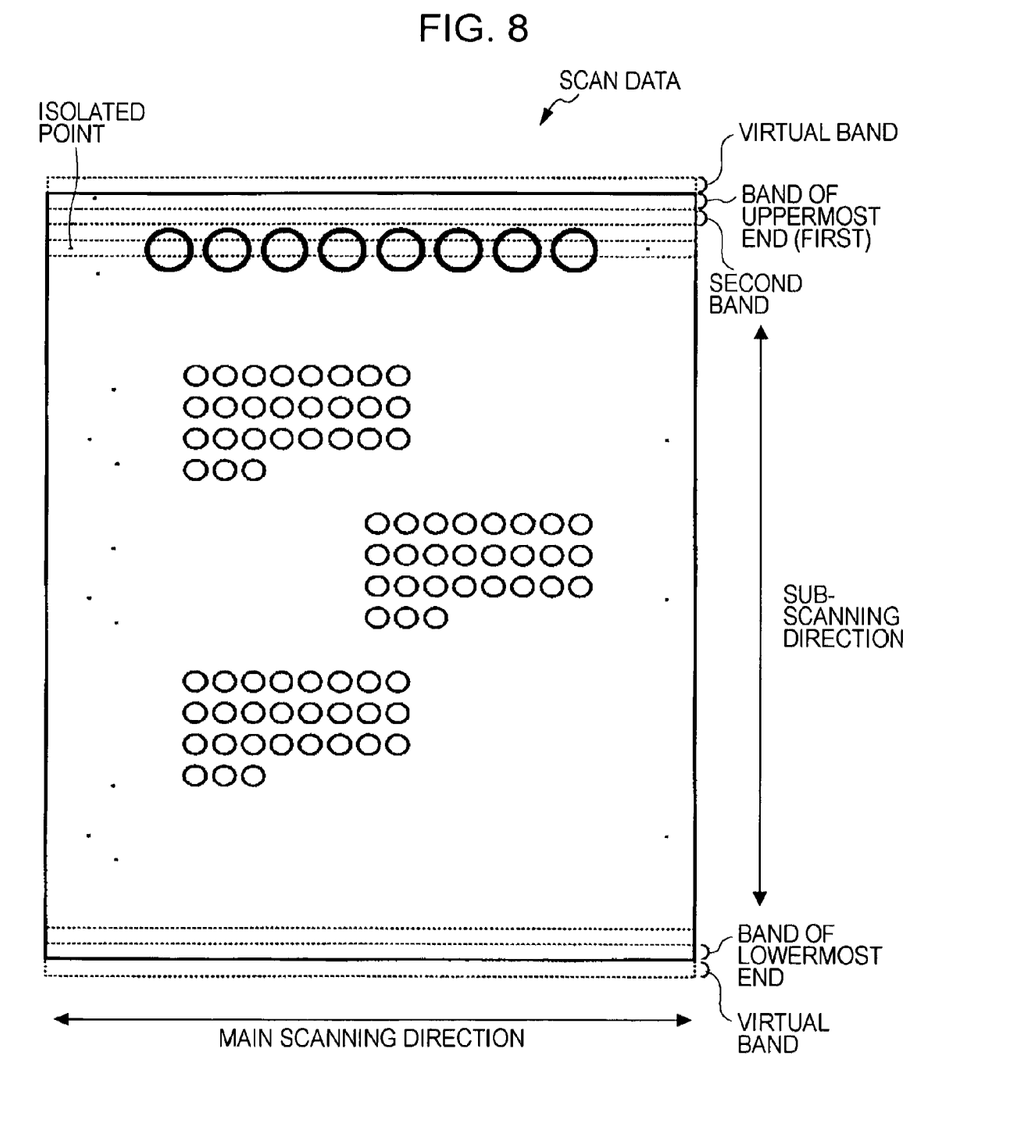
FIG. 8 is a diagram for explaining scan data.

When the logical seek print routine is started, the CPU 22 of the controller 20 firstly performs an initialization operation (step S100). In this case, setting a threshold value T and the like used to analyze a histogram described below is performed. The threshold value T is a value used to determine whether printing pixels present in the document, which is the target M, are isolated points generated due to dusts or the like. The threshold value T is set so as to become larger as a scanner resolution set through the operation panel 70 is higher. That is because the isolated point having a certain size is recognized to have many printing pixels as the scanner resolution is higher. Subsequently, the histogram of a virtual band is prepared (step S102). A band is constituted by a predetermined number (for example, 16 lines in a case of 360 dpi) of lines accumulated sequentially in the sub-scanning direction. FIG. 8 is a diagram for explaining the scan data. The scan data is constituted in the sub-scanning direction by a plurality of the bands. The virtual bands are prepared in a band positioned in the uppermost end and a band positioned in the lowermost end. The number of printing pixels of these virtual bands is zero in the entire area, that is, all the pixels of these virtual bands become a white color. Subsequently, a processing band is set as the band positioned in the uppermost (first) end (step S104). In this case, the processing band refers to a band having the isolated point to be removed.

Figure 5:
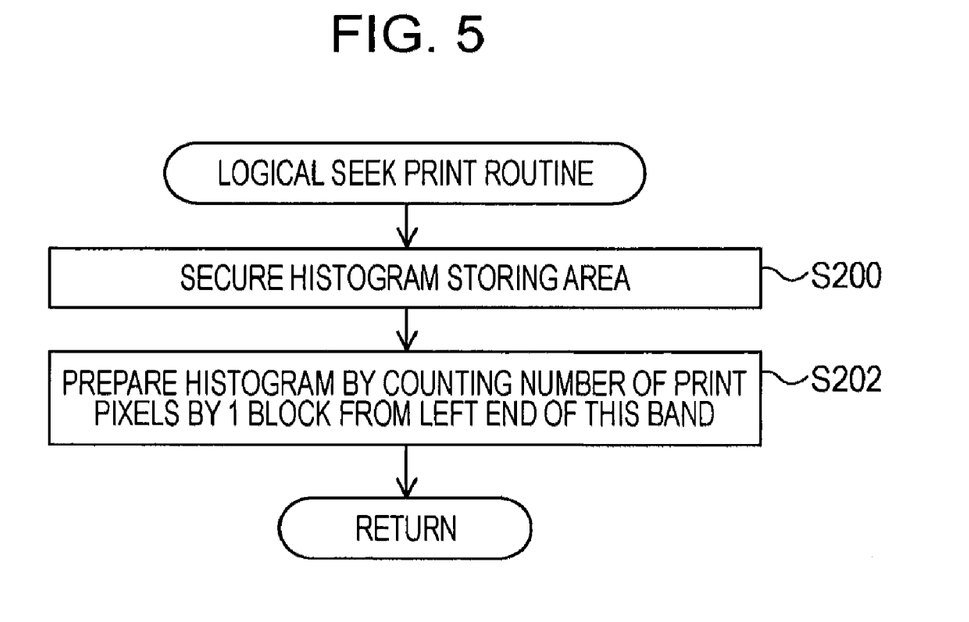
FIG. 5 is a diagram illustrating a flowchart of a histogram-making routine.
Figure 9:
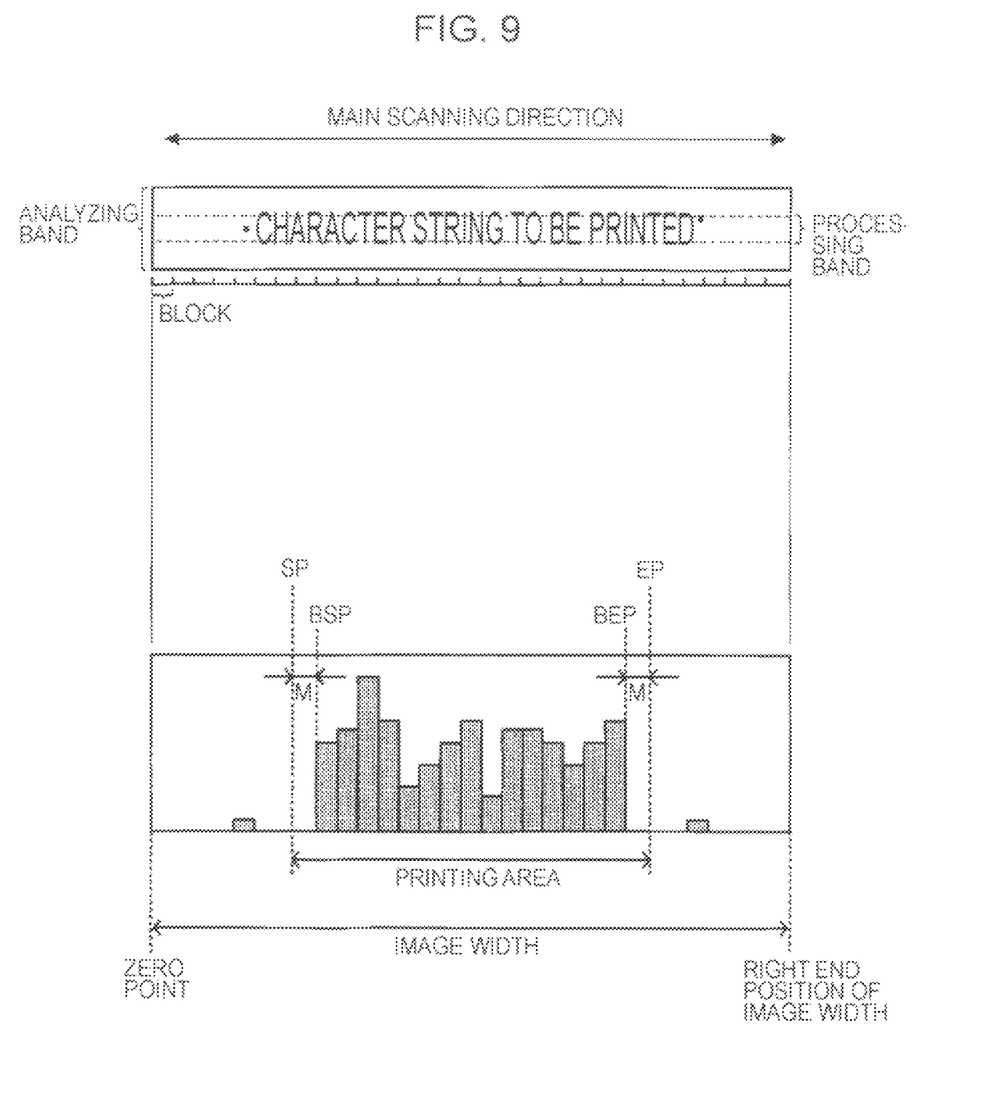
FIG. 9 is a diagram for explaining an example of a histogram of a processing band.

Subsequently, the CPU 22 of the controller 20 reads data of the processing band among the scan data (image data) from the scanner buffer 26a (step S106) and prepares the histogram (step S108). FIG. 5 is a diagram illustrating a flowchart of a histogram-making routine executed in step S108. When this routine is started, an area for storing the histogram in the RAM 26 is secured (step S200), the histogram is prepared by counting the number of printing pixels by one block from the left end of this band (step S202), and then this routine is ended. FIG. 9 is a diagram for explaining an example of the histogram of the processing band. Here, the left end of the band refers to a left end (zero point) of the image width. In addition, the block refers to a section in which a predetermined number (for example, several pixels or tens of pixels) of pixels in the main scanning direction are arranged. The routine is returned to the flowchart shown in FIG. 4. The next band of the processing band after step S108, that is, the band directly below the processing band is read from the scanner buffer 26a (step S112), and a histogram is prepared by performing the above-described histogram-making routine (see FIG. 5) (step S114). As a result, histograms of the total three bands, that is, the processing band and each one above and below the processing band are accumulated in the RAM 26. The histogram of the band directly above the processing band becomes, for example, in a case where the processing band is the first band, the histogram of a virtual band because it is prepared in step S102.

Figure 6:
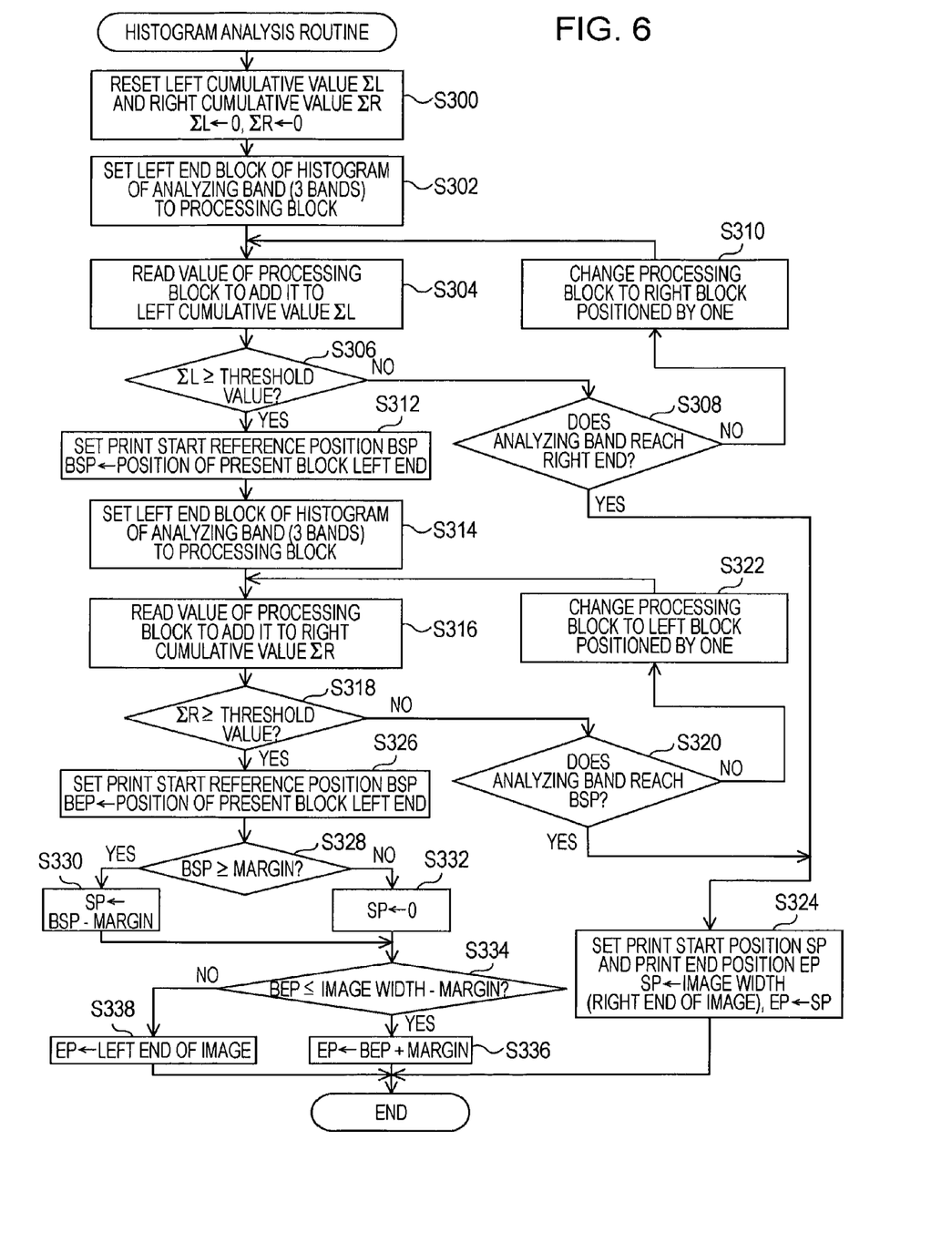
FIG. 6 is a diagram illustrating a flowchart of a histogram-analyzing routine.

Subsequently, an analysis operation of the histograms for the three bands is performed (step S116). FIG. 6 is a diagram illustrating a flowchart of a histogram-analyzing routine executed in step S116. When this routine is started, the CPU 22 of the controller 20 first resets a left cumulative value ΣL and a right cumulative value ΣR (step S300), and then sets the left end block of the histograms for analyzing bands (the total three band of the processing band and each band above and below the processing band) at this time (step S302). Subsequently, the number of printing pixels (the number of pixels other than the white color) contained in the processing block is read, and the number of the printing pixels is added to the left cumulative value ΣL (step S304). Subsequently, it is determined whether the left cumulative value ΣL becomes the threshold value T or more (step S306). Here, the threshold value T is a value which is set in the initialization operation (step S100) of the logical seek print routine. Specifically, it is known from experience that the cumulative value of the number of printing pixels is abruptly increased in a block in which characters or the like (character, figures, signs, etc.) are present, comparing with a block in which isolated points are present due to dust or the like. Consequently, the threshold value T is experientially set as a value which cannot be reached even when the number of printing pixels for the isolated points is cumulated and can be reached when the number of printing pixels for the characters or the like is cumulated. Subsequently, when the left cumulative value ΣL is less than the threshold value T, it is determined whether the processing block reaches the right end of the analyzing band (step S308). When the processing block has not reached the right end thereof, the processing block is changed to the right block by one block (step S310), and then step S304 and the following steps are again performed. In this way, the processing block is changed sequentially from the block positioned in the left end to right end of the analyzing band. Alternatively, when the processing band reaches the right end of the analyzing band in step S308, the total sum of the number of the printing pixels which are present from the left end of the analyzing band to the right end thereof has not reached the threshold value T. Consequently, it is considered that the printing area is not present in this processing band. In addition, the right end position of the image width is set as a print start position SP, the same position as that is also set as a print end position EP (step S324), and this routine is ended. The print start position SP refers the left end of a printing range and the print end position EP refers the right end of the printing range (see FIG. 9).

Alternatively, when the left cumulative value ΣL is the threshold value T or more in step S306, it is considered to be within the printing area, and then the block positioned at the left end at this time is set as a print start reference position BSP (step S312). Here, the print start reference position BSP refers to a reference position when the print start position SP is obtained. After the print start reference position BSP is set in this way, the block positioned at the right end of the histogram for the analyzing band at this time is set as the processing block (step S314). Subsequently, the number of printing pixels included in the processing block is read and the number of printing pixels is added to the right cumulative value ΣR (step S316). Subsequently, it is determined whether the right cumulative value ΣR is the threshold value T or more (step S318). When the right cumulative value ΣR is less than the threshold value T, it is determined whether the processing block reaches the block including the print start reference position BSP (step S320). When the processing block has not reached, the processing block is changed into the left block by one block (step S322), and then step S316 and the following steps are performed. In this way, the processing block is changed sequentially from the right end block of the analyzing band to the left end block thereof. Alternatively, when the processing block has reached the block including the print start reference position BSP in step S320, it is considered that the printing area is not present in the processing band. In addition, the right end position of the image width is set as the print start position SP, the same position as that is also set as the print end position EP (step S324), and this routine is ended.

Alternatively, when the right cumulative value ΣR is the threshold value T or more in step S318, it is considered to be within the printing area, and then the block positioned at the right end at this time is set as a print end reference position BEP (step S326). Here, the print end reference position BEP refers to a reference position when the print end position EP is obtained. After the print end reference position BEP is set in this way, the print start position SP and the print end position EP are set on the basis of the print start reference position BSP and the print end reference position BEP. That is, it is determined whether the print start reference position BSP is a margin value m or more (step S328). When the print start reference position BSP is a margin value m or more, a position obtained by subtracting the margin value m from the print start reference position BSP is set as the print start position SP (step S330). Alternatively, the print start reference position BSP is less than a margin value m, a zero point, that is, a left end position of the image width is set as the print start position SP (step S332). For example, in a case where one isolated point is not present at all, the margin value m is a value which is set in consideration of a case where the print start reference position BSP intrudes into the printing area. In this case, the margin value m is set as the threshold value T. For example, in a case where a rule line extended in the main scanning direction by a length of one pixel is present in the processing band of the analyzing band, but the printing pixel other than the rule line is not present, the cumulated printing pixels are all pixels constituting the rule line by setting the margin value m as the threshold value T in this way. However, by restoring the number of printing pixels by the number of pixels of the threshold value T, it is possible to treat the cumulative number of printing pixels not as the isolated points but as the points to be printed. After steps S330 or S332, it is determined whether the print end reference position BEP is a value (comparative value) or less obtained by subtracting the margin value m from the right end position of the image width (step S334). When the print end reference position BEP is the comparative value or less, the position obtained by adding the margin value m to the print end reference position BEP is set as the print end position EP (step S336). Alternatively, when the print end reference position BEP exceeds the comparative value, the right end position of the image width is set as the print end position EP (step S338), and then the routine is ended. An example of the print start position SP and the print end position EP set in this way is illustrated in FIG. 9. Before the end of this routine, the histogram directly above the processing band at this time may be deleted from the RAM 26 since the histogram is not used in the subsequent steps. Alternatively, when the next histogram is prepared, the next histogram may be overwritten on this histogram. In this way, it is possible to reduce a capacity of the area in which the histogram is stored.

Figure 7:
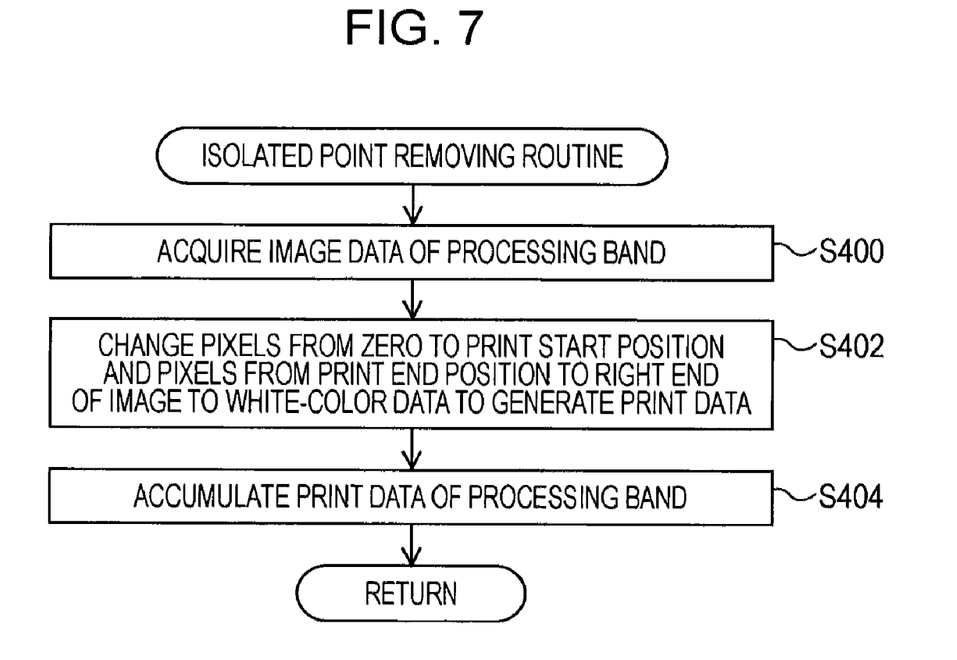
FIG. 7 is a diagram illustrating a flowchart of an isolated point removing routine.

The process is returned to the routine in FIG. 4. After analysis of the histogram in step S116, a operation of removing the isolated points of the processing band at this time is performed (step S118). FIG. 7 is a diagram illustrating a flowchart of the isolated point removing routine executed in step S118. When this routine is started, the CPU 22 of the controller 20 acquires image data of the processing band (step S400). In addition, of the acquired data, the printing data of the processing band is generated by changing pixels from the zero point to the print start position SP and pixels from the print end position EP to the right end position of the image width into a white color (step S402), the printing data is stored in the printing buffer 26b (step S404), and then this routine is ended. In this way, all the printing pixels which are present from the print start position SP to the print end position EP other than the printing area are considered as the isolated points, and changed into the white color. The process is again returned to the routine in FIG. 4. After the isolated points in step S118 is all removed, an instruction is output to the printer ASIC 42 so as to perform the printing on the basis of the printing data of the processing band at this time (step S120), and then it is determined whether all the bands of the scan data is processed (step S122). Alternatively, when all the bands have not yet been processed, the process band is updated to the band positioned below by one band (step S124), and then the subsequent steps of step S108 are performed. At this time, the reason why the routine is not returned to step S106 but returned to step S108 is that the histogram of the processing band after the update has been already made in step S112 before the update. Alternatively, when the processes for all the bands of the scan data have been ended, it is determined whether a plurality of copies are set (step S126). When the plurality of copies are set, an instruction is output to the printer ASIC 42 so as to print necessary copies using the printing data of each band accumulated in the printing buffer 26b (step S128), and then this routine is ended. Alternatively, when the plurality of copies is not set, this routine is immediately ended. As a result, even when the isolated points are present in areas other than character string existence areas A1 to A3, as shown in FIG. 12, movement of the printing head 47 in the logical seek printing is directed to white arrows shown in FIG. 11.

Constituent elements according to the embodiment correspond to constituent element according to the invention as follows. That is, the multi-function printer 10 according to the embodiment corresponds to an image processing apparatus or a copier according to the invention. The scanner mechanism 31 corresponds to a scanner mechanism. The CPU 22 of the controller 20 corresponds to a printing-pixel number distribution grasping member, a processing-band setting member, a reference position setting member, and a printing-data generating member. The printer mechanism 41 corresponds to a serial printer. In addition, the histogram-making routine in FIG. 5 (steps S108 and S114 in FIG. 4) corresponds to a process of the printing-pixel number distribution grasping member. Steps S104, S122, and S124 in FIG. 4 correspond a process of the processing-band setting member. Steps S302 to S312 and steps S314 to S326 of the histogram-analyzing routine in FIG. 6 correspond to the reference position setting member. Steps S328 to S338 correspond to the printing-data generating member. In addition, the threshold value T corresponds to an upper limit value of a predetermined range. In this embodiment, an example of an image processing method according to the invention is clearly described by describing the operation of the multi-function printer 10.

According the above-described embodiment, the ink jet printer unit 40 is provided with the printing data which makes it possible to sufficiently shorten a printing period of time upon using the logical seek function even when the isolated points are included in the image data read by the scanner mechanism 31. In addition, when the cumulative value of the number of printing pixels is obtained, the total three bands of the processing band the bands each present above and below the processing band are set as the analyzing band. Consequently, the upper portion or the lower portion of a character may not be processed as the isolated point, comparing with a case where only the processing band is set as the analyzing band. In addition, the printing data is generated by changing the pixels present in an area other than the printing area in the image data into a white color. Consequently, the ink jet printer unit 40 which has acquired the printing data can shorten the printing period of time by performing the printing operation on the basis of the normal logical seek. In addition, in setting the printing area, a position returned from the print start reference position BSP to the one end of the processing band by the predetermined value m (which is the same as the threshold value T) is also set as the print start position SP, and a position advanced from the print end reference position BEP to the other end by the margin value m as the print end position EP. Consequently, the print start position SP or the print end position EP may not be set in the inside of the printing area. In addition, the width direction (main scanning direction) of the analyzing band is divided into a block unit containing a predetermined plurality of pixels and the number of the printing pixels of every block is cumulated. Consequently, a capacity of a storage area for storing the cumulative value may be smaller, comparing with a case where the number of printing pixels of every one pixel is cumulated. Moreover, the cumulative value is obtained by sequentially cumulating the number of printing pixels of the analyzing band from the one end to the other end, and when the other end is reached in a stat where the cumulative value has not jet exceeded a predetermined range (positive determination in step S308), it is apparent that no pixel to be printed is present in the processing band included in the analyzing band. Consequently, a processing period of time can be shortened by omitting a cumulating operation in a reverse direction, that is, in a direction directed from the other end to the one end.

The invention is not limited to the above-described embodiment, but may be embodied in one of various forms within a technical scope of the invention.

For example, in the above-described embodiment, the isolated points have been removed by the logical seek print routine in FIG. 4 (step S118). However, instead of removing the isolated points, an instruction added with the print start position SP and the print end position EP of each band may be output when the instruction is outputted to the printer ASIC 42 so as to perform a printing operation on the basis of the printing data of the processing band at this time in step S120. In this case, the printer ASIC 42 allows only the printing area to be printed by grasping the printing area from the print start position SP and the print end position EP. As a result, since the process of changing the pixels present in the area other than the printing area into the white color is not necessary in the logical seek print routine, the period of time necessary to generate the printing data can be shortened.

Figure 10:
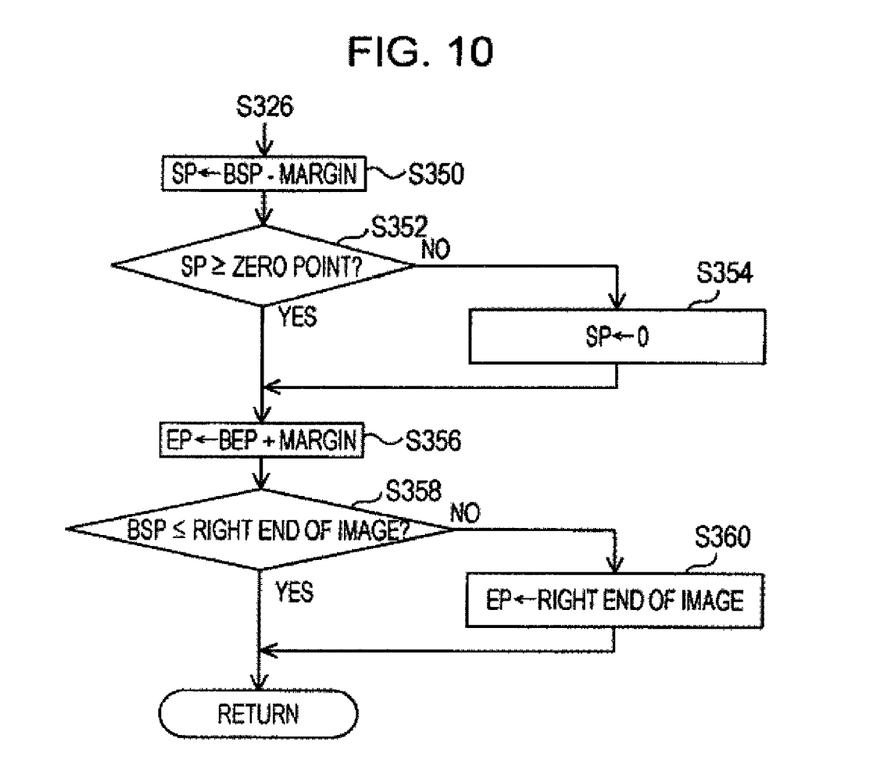
FIG. 10 is a diagram illustrating a flowchart of another histogram-analyzing routine.

In the above-described embodiment, when the print start position SP and the print end position EP are set by the histogram-analyzing routine in FIG. 6, steps S328 to S338 have been performed, but steps S350 to S360 in FIG. 10 may be performed instead. That is, after step S326, a position obtained by subtracting the margin value m from the print start reference position BSP is set as the print start position SP (step S350), and it is determined whether the print start position SP is equal to or larger than the zero point (step S352). When the print start position SP is equal to or larger than the zero point, step S356 proceeds. Alternatively, when the print start position SP is smaller than the zero point, the zero point is reset as the print start position SP (step S354), and then the routine proceeds to step S356. In addition, in step S356, a position obtained by adding margin value m to the print end reference position BEP is set as the print end position EP, and it is determined whether the print end position EP does not reach the right end position of the image width (step S358). When the print end position EP does not reach the right end of the image width, the routine is ended. Alternatively, when the print end position EP exceeds the right end of the image width, the print end position EP is reset to the right end of the image width (step S360), and the routine is ended.

In the above-described embodiment, in step S102 of the logical seek print routine in FIG. 4, each virtual band each above the uppermost band and below the lowermost band have been prepared. However, instead of preparing such virtual bands, the total two bands of the uppermost band and the band below the uppermost band may be prepared as the analyzing bands for the uppermost band. The total two bands of the lowermost band and the band above the lowermost band may be prepared as the analyzing bands. In this case, the same advantages as those of the above-described embodiment can also be obtained.

In the above-described embodiment, the margin value m has been set as the same value of the threshold value T, but the margin value m may be set to have a value larger than the threshold value T. In this case, it is possible to prevent the print start position SP and the print end position EP from intruding into an area in which characters or the like are present. However, if the margin value m is set to be considerably large, the isolated points not to be printed may be printed. Consequently, the margin value m has to be set in consideration of this fact.

In the above-described embodiment, the multi-function printer 10 mounting with the scanner unit 30 and the ink jet printer unit 40 has been exemplified. However, the image processing apparatus according to the invention is applicable to a scanner apparatus (which includes the scanner unit 30, but does not include the ink jet printer unit 40). In this case, the generated printing data may be transported to an external ink jet printer which has the logical seek function. In addition, steps S100 to S116 of the logical seek print routine in FIG. 4 may be used in an application such as a process of making PDF. When a printing operation of the PDF made in the way is performed using the logical seek function, the advantage such as the sufficient shortening of the printing period of time can be obtained like the above-described embodiment.

What is claimed is:

1. An image processing apparatus which generates printing data used in a serial printer having a logical seek function, the image processing apparatus comprising:
a scanner mechanism that reads an image of a document to set the read image as image data;
a printing-pixel number distribution grasping member that sets a band constituted by a predetermined number of sequentially accumulated lines in the image data as one unit, and grasps distribution of the number of printing pixels in a main scanning direction of the serial printer in every band;
a processing-band setting member that sequentially sets each band as a processing band;
a reference position setting member that sets an analyzing band including the set processing band, that obtains a first cumulative value by cumulating the number of printing pixels of the analyzing band sequentially from a first end to a second end of the analyzing band, and sets a position in the main scanning direction at the time when the first cumulative value exceeds a predetermined range as a print start reference position, and that obtains a second cumulative value by cumulating the number of printing pixels of the analyzing band sequentially from the second end to the first end of the analyzing band and sets a position in the main scanning direction at the time when the second cumulative value exceeds the predetermined range as a print end reference position, wherein in setting the analyzing band, the reference position setting member sets the processing band and one or more bands each present above and below the processing band as the analyzing band; and
a printing-data generating member that generates printing data by setting a printing area on the basis of the print start reference position and the print end reference position.

2. The image processing apparatus according to claim 1, wherein in setting the analyzing band, the reference position setting member sets the total three bands of the processing band and two bands each present above and below the processing band, wherein the reference position setting member prepares a virtual band of which all pixels are white above the uppermost band and prepares the virtual band below the lowermost band, and wherein when the uppermost band or the lowermost band is set as the processing band, the reference position setting member adds the virtual band as one of the three bands.

3. The image processing apparatus according to claim 1, wherein in setting the printing area, the printing-data generating member sets a position returned from the print start reference position to the first end by a predetermined margin as the print start position of the printing area, and also sets a position advanced from the print end reference position to the second end by the predetermined margin as the print end position.

4. The image processing apparatus according to claim 3, further comprising a printing-area setting member that sets the pixel number of an upper limit value of the predetermined range as the margin value.

5. The image processing apparatus according to claim 3, wherein the printing-data generating member generates printing data by changing pixels present in an area other than the printing area into a white color in the image data.

6. The image processing apparatus according to claim 3, wherein the printing-data generating member generates printing data by adding information about the printing area to the image data.

7. The image processing apparatus according to claim 3, wherein in cumulating the number of printing pixels of the analyzing band, the printing-pixel number distribution grasping member divides a width direction of the analyzing band into a block unit containing a predetermined plurality of pixels and cumulates the number of printing pixels of every block.

8. The image processing apparatus according to claim 3, wherein the reference position setting member obtains a third cumulative value by cumulating the number of printing pixels of the analyzing band sequentially from the first end to the second end, and wherein when the third cumulative value does not exceed a predetermined range at the second end, the reference position setting member does not cumulate the number of printing pixels of the analyzing band sequentially from the second end to the first end, and it is considered that the printing area of the processing band is not present.

9. A copier comprising: the image processing apparatus according to claim 3; and a serial printer that receives printing data from the image processing apparatus and performs a printing operation using a logical seek function on the basis of the printing data.

10. An image processing method which generates printing data used in a serial printer having a logical seek function and is executed by computer software, the method comprising:
(a) reading an image of a document to set the read image as image data;
(b) setting a band constituted by a predetermined number of sequentially accumulated lines in the image data as one unit, and grasps distribution of the number of printing pixels in a main scanning direction of the serial printer in every band;
(c) sequentially setting each band as a processing band;
(d) setting an analyzing band including the set processing band, obtaining a first cumulative value by cumulating the number of printing pixels of the analyzing band sequentially from a first end to a second end of the analyzing band to set a position in the main scanning direction at the time when the first cumulative value exceeds a predetermined range as a print start reference position, and obtaining a second cumulative value by cumulating the number of printing pixels of the analyzing band sequentially from the second end to the first end of the analyzing band to set a position in the main scanning direction at the time when the second cumulative value exceeds the predetermined range as a print end reference position, wherein in setting the analyzing band, the reference position setting member sets the processing band and one or more bands each present above and below the processing band as the analyzing band; and
(e) generating printing data by setting a printing area on the basis of the print start reference position and the print end reference position.

11. A non-transitory computer-readable storing medium storing a program to be executed by one or plural computers for carrying out the image processing method according to claim 10.

* * * * *